(12) United States Patent
Serbajlo et al.

(10) Patent No.: US 12,244,773 B2
(45) Date of Patent: Mar. 4, 2025

(54) MULTIPLE DEVICE CONFERENCING WITH IMPROVED DESTINATION PLAYBACK

(71) Applicant: RealtimeBoard, Inc., San Francisco, CA (US)

(72) Inventors: Pavel Serbajlo, Menlo Park, CA (US); Marián Zákutný, Kosice (SK); Dominik Zane, Redwood City, CA (US); Jakub Fiala, London (GB)

(73) Assignee: RealtimeBoard, Inc., San Francisco, CA (US)

( * ) Notice: Subject to any disclaimer, the term of this patent is extended or adjusted under 35 U.S.C. 154(b) by 0 days.

(21) Appl. No.: 18/217,726

(22) Filed: Jul. 3, 2023

(65) Prior Publication Data

US 2023/0353679 A1    Nov. 2, 2023

Related U.S. Application Data

(60) Continuation of application No. 17/718,296, filed on Apr. 11, 2022, now Pat. No. 11,695,875, which is a division of application No. 16/996,882, filed on Aug. 18, 2020, now Pat. No. 11,303,757.

(60) Provisional application No. 62/990,996, filed on Mar. 17, 2020, provisional application No. 62/888,646, filed on Aug. 19, 2019.

(51) Int. Cl.
*H04M 3/56* (2006.01)
*H04L 12/18* (2006.01)

(52) U.S. Cl.
CPC ........ *H04M 3/568* (2013.01); *H04L 12/1822* (2013.01); *H04L 12/1827* (2013.01); *H04L 12/1831* (2013.01)

(58) Field of Classification Search
CPC ............... H04M 3/568; H04L 12/1822; H04L 12/1827; H04L 12/1831
See application file for complete search history.

(56) References Cited

U.S. PATENT DOCUMENTS

| | | | |
|---|---|---|---|
| 10,628,901 B1* | 4/2020 | Ancona | H04W 4/38 |
| 2003/0001890 A1* | 1/2003 | Brin | H04L 12/1822 |
| | | | 715/753 |
| 2003/0200001 A1 | 10/2003 | Goddard | |
| 2010/0245534 A1* | 9/2010 | De Lind Van Wijngaarden | H04N 7/148 |
| | | | 348/E7.083 |
| 2015/0236966 A1* | 8/2015 | Francini | H04L 43/16 |
| | | | 370/235 |
| 2016/0014373 A1 | 1/2016 | LaFata et al. | |
| 2018/0249124 A1* | 8/2018 | Tangeland | H04N 7/147 |
| 2019/0041958 A1* | 2/2019 | Clark | G06F 1/32 |

OTHER PUBLICATIONS

Extended European Search Report received in European application No. 24193167.4, mailed on Oct. 4, 2024.

* cited by examiner

*Primary Examiner* — Raqiul A Choudhury
(74) *Attorney, Agent, or Firm* — Cognition IP, P.C.; Edward Steakley; Rajesh Fotedar

(57) ABSTRACT

Disclosed are systems and methods for providing a virtual conference using personal devices of the participants. In one embodiment, a proximity value is generated and encoded in audio streams from each device. A server can compare proximity values and enable a suitable microphone, while disabling the remaining microphones. Systems and techniques for improving capturing and synchronization of source audio and improved audio playback at destination are also disclosed.

18 Claims, 11 Drawing Sheets

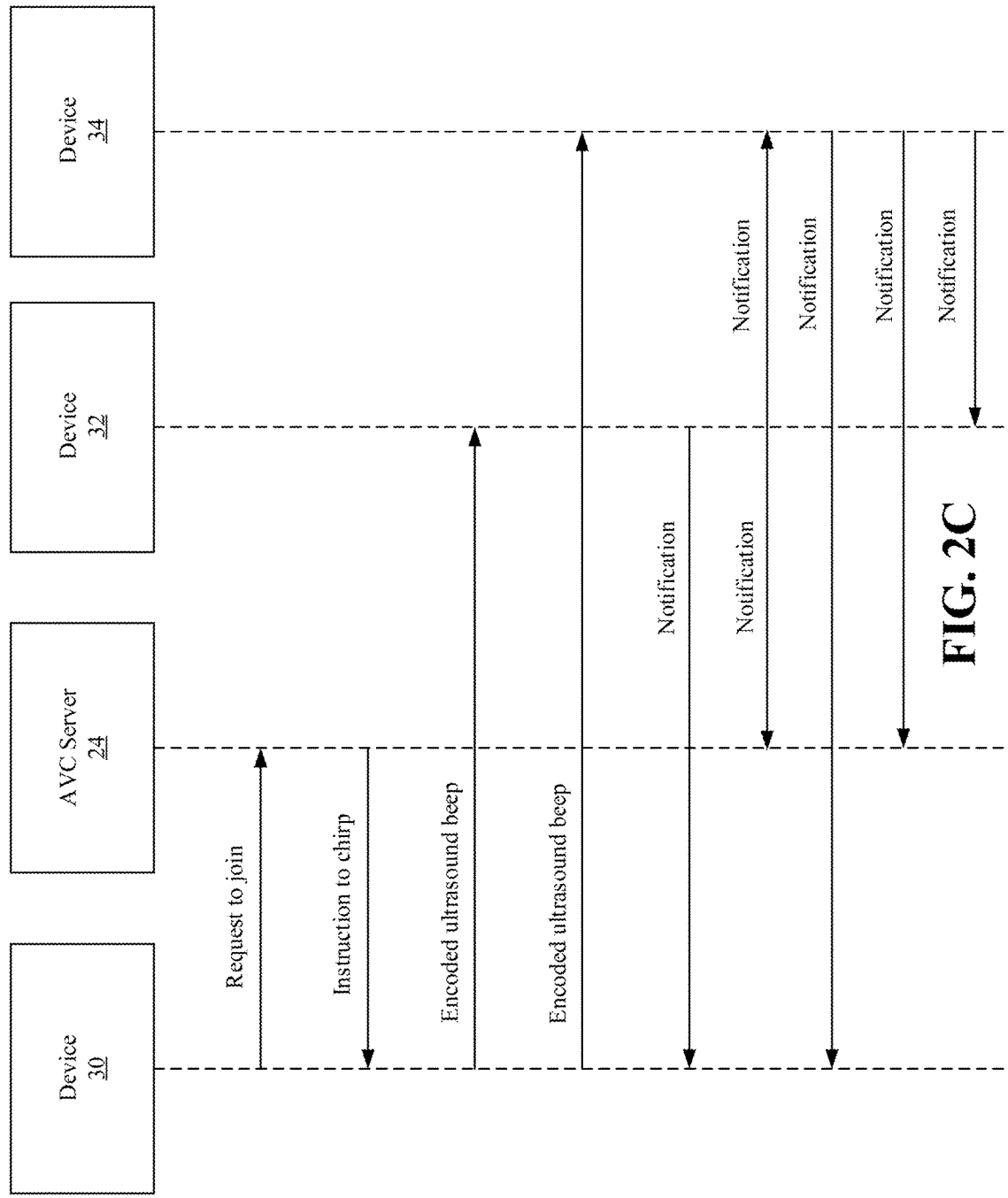

MULTIPLE DEVICE CONFERENCING WITH IMPROVED DESTINATION PLAYBACK

CROSS-REFERENCE TO RELATED APPLICATIONS

This application is a continuation of U.S. application Ser. No. 17/718,296, filed Apr. 11, 2022, which is a divisional of U.S. application Ser. No. 16/996,882, filed Aug. 18, 2020, which claims the benefit of U.S. Provisional Patent Applications Nos. 62/888,646 and 62/990,996, filed Aug. 19, 2019 and Mar. 17, 2020 respectively, which are hereby incorporated by reference in their entirety.

FIELD OF INVENTION

This invention relates generally to the field of virtual conferencing, and in particular, to conducting virtual conferencing using personal devices of a virtual conference participants.

BACKGROUND

Virtual conferencing has become an important tool in the modern age. With the rise in globalization, businesses and individuals may have to connect with coworkers and colleagues in locations that can span the globe. Existing virtual conferencing techniques utilize specialized and high-quality audio and video equipment and control for environmental factors to eliminate or reduce signal delay when transmitting audio and video signals. At the same time, wide-spread use of personal computing devices (such as smart phones, tablets and laptops) has made these devices more accessible. These devices typically include, relatively high-quality camera and microphone components, and thus have been used for one-on-one audio and video communication. These devices also can be candidates for enabling virtual conference sessions with multiple participants.

SUMMARY

In one aspect, a method of virtual conferencing is disclosed. The method includes: detecting source devices and destination devices of conference participants, wherein the source and destination devices comprise microphones and speakers; receiving audio streams using the microphones of the source devices; generating proximity values, wherein the proximity values comprise estimations of distances of sources of the audio streams to the microphones receiving the audio streams; encoding the audio streams with proximity values; transmitting the encoded audio streams to a server; and transmitting the audio stream with the highest proximity value to destination devices. In some embodiments for automatic identification and pairing of co-present devices near a physical location, methods, systems and computer program products are directed to: generating an ultrasonic code for a first computer device; sending code data based on the ultrasonic code to the first device to enable the first computer device to broadcast an audio signal based on the ultrasonic code; receiving decode data from a second computer device; verifying the decode data represents the second computer device correctly decoded the ultrasonic code broadcasted by the first computer device; and based on verification, pairing the first and second computer devices. The first and second computer devices may be paired along with other paired devices in a co-present grouping of devices for a virtual conference whereby the paired devices are physically near each other.

In some embodiments for synchronization of audio playback of incoming audio streams received from far-end devices, methods, systems and computer program products are directed to: receiving, at a primary device, incoming audio streams from a plurality of far-end devices; downmixing, at the primary device, the incoming audio streams to generate a downmixed audio stream; determining, at the primary device, a dynamic delay factor for delaying playback of the downmixed audio stream at the primary device; and sending, at the primary device, the downmixed audio stream to a respective dynamically-resized delay buffer of one or more secondary devices to synchronize playback of the downmixed audio stream at the primary device and the one or more secondary devices.

In some embodiments for synchronization of co-present microphones for an outgoing stream sent to far-end devices, methods, systems and computer program products are directed to: determining, at a primary device, a dynamic delay based on one or more audio streams received from respective secondary devices; applying, at the primary device, the dynamic delay to microphone data from one or more microphones of the primary device; downmixing, at the primary device, the one or more audio streams received from the respective secondary devices and the primary device's delayed microphone data to generate an outgoing downmixed audio stream; and sending, from the primary device, the outgoing downmixed audio stream to at least one far-end device.

In one embodiment, a proximity value is generated via a voice feature extraction.

In one embodiment, the method further includes, enabling a microphone associated with the chosen audio stream and disabling the remaining microphones.

In another embodiment, the method further includes applying a smoothing algorithm to one or more audio streams when potential for erratic audio behavior is detected.

In one embodiment, the method further includes: receiving video streams from the source devices; and detecting visual cues indicative of active speaker from the video streams.

In another embodiment, the visual cue comprises human lip movement.

In one embodiment, the method, further includes: receiving pre-recorded samples of the participants' voices; using the pre-recorded samples, training an artificial intelligence model to associate an audio stream with a participant.

In another embodiment, the method, further includes: choosing a speaker of a destination device, and transmitting the audio stream with the highest proximity value, only to the chosen speaker; and playing that audio stream from the chosen speaker.

In one embodiment, the method, further includes: forming a local real-time transport protocol (RTP) network within the destination devices; transmitting the audio stream having the highest proximity value to a master destination device within the RTP network, wherein the master destination device is configured to distribute that audio stream to remaining destination devices.

In another embodiment, the method, further includes selecting the master destination device based at least partly on its hardware specifications.

In one aspect a method of audio playback at a destination in a virtual conference is disclosed. The method includes: receiving two or more audio signals from a server, wherein the two or more audio signals originate from two or more source devices of the virtual conference; connecting two or more destination devices of the virtual conference via a wireless network; selecting a primary device among the destination devices of the virtual conference; selecting one or more secondary devices among the destination devices of the virtual conference; transmitting the two or more audio signals from the server to the primary device; combining the two or more audio signals into a playback audio signal; scheduling playback times on the primary device and the secondary devices; transmitting the playback audio signal to the secondary devices; and playing the playback audio signal according to the scheduled playback times.

In another aspect, a method of capturing and transmitting a source audio signal in a virtual conference is disclosed. The method includes: selecting a primary device among the source devices of the virtual conference; selecting secondary devices among the source devices of the virtual conference; connecting primary and secondary source devices of the virtual conference via a wireless network; receiving audio signals from the primary and secondary devices microphones; synchronizing the audio signals into a transmission audio signal; and transmitting the synchronized audio signal to a server.

It is understood that all steps, operations, functions and acts described herein as being performed by a respective computer device may performed according to an instance of an AVC application ("AVC app") running on the respective computer device.

It is understood that various embodiments described herein may be implemented according to a system that comprises one or more processors and a non-transitory computer readable medium storing a plurality of instructions, which when executed, cause the one or more processors to perform any or all of the steps, operations, functions and acts described herein.

It is understood that various embodiments described herein may be implemented according to a computer program product comprising a non-transitory computer-readable medium having a computer-readable program code embodied therein to be executed by one or more processors wherein the program code includes instructions for performing any or all of the steps, operations, functions and acts described herein.

BRIEF DESCRIPTION OF THE DRAWINGS

These drawings and the associated description herein are provided to illustrate specific embodiments of the invention and are not intended to be limiting.

FIG. 2C illustrates a diagram for identifying devices of participants in the AVC system.

DETAILED DESCRIPTION

Figure 1:
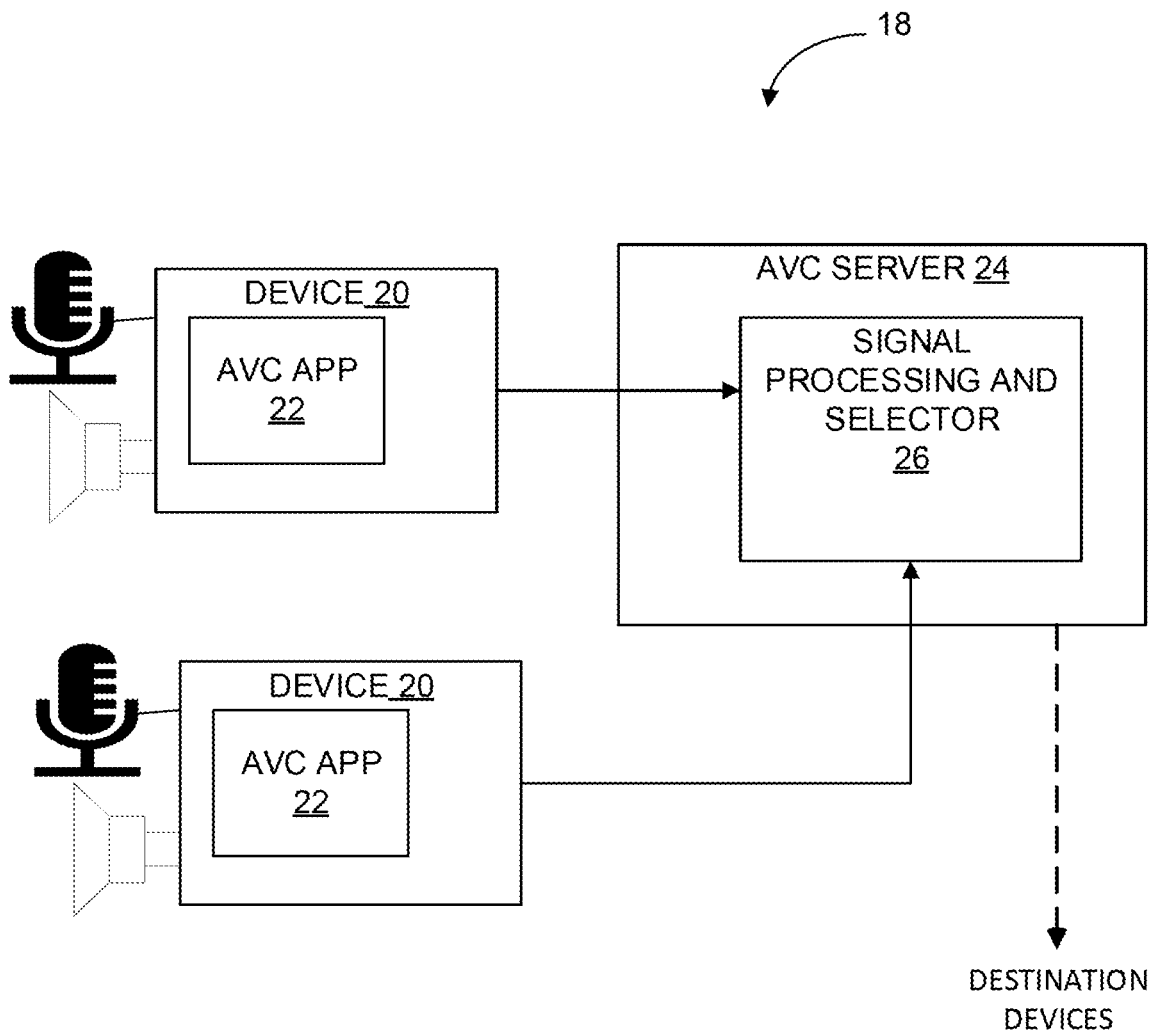
FIG. 1 illustrates a block diagram of an audio video conferencing (AVC) system according to an embodiment.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Traditional virtual conference solutions utilize controlled environments and dedicated devices, in order to deliver their services. They may include hardware room setup with TV, cameras, speakers, processing units and other hardware to enable audio/video conferencing. In the context of audio conferencing, attendees may gather around in a dedicated conference room and around a central microphone in order to generate a single audio source, which can be transmitted to a destination location. By using a single audio source, problems with delay, echo or other negative auditory experiences can be reduced or avoided. Where one single audio source, such as a microphone, is not enough, traditional solutions use equipment, designed to minimize delay, or at least have equal delay, so the destination participants can experience a pleasant auditory experience. For example, multiple microphones can be used if they are placed or designed in a manner that each microphone delay is somewhat the same (e.g., by using equal length cables connecting microphones to a receiver).

In recent years, portable devices, such as mobile phones, tablets, and laptops have become ubiquitous and many individuals have access to or carry a personal or business portable device. These devices are mostly equipped with microphones, cameras and wireless communication interfaces to connect to the internet or cellular phone networks. Nonetheless, the potential for using portable devices for virtual conferencing, where participants use their personal or company-issued device for conferencing, has not been explored. This is due to several challenges that latency-variant multiple-device virtual conferencing can experience. Typically, if existing audio-video conferencing software were used on ordinary, personal smart phones, tablets and laptops to conduct a virtual conference, the resulting audio experience can be subpar. For example, when multiple speakers and microphones are present in one physical space, infinite echo or acoustic feedback loops and other positive feedback loop mechanisms can be created, which can in turn be heard as squealing. Also, using traditional audio-video conferencing software with personal devices of participants can generate perceived multiplication and out-of-sync audio streams for destination recipients because each device's microphone is individually connected to the internet and transmits audio with its own latency, which can be different than other devices in the conference. Nonetheless, the widespread availability and use of smart phones, tablets and laptops, make them desirable candidates for enabling virtual conferencing if the associated technical challenges can be addressed. For example, attendees can use their portable devices (e.g., laptops, tablets, smartphones, smart watches or similar devices) to enable audio/video conferencing on the spot. They can use their device microphones, speakers and cameras to join or participate in a video conference. If the attendees are in the same location, a disclosed embodiment, enables automatic switching to be performed between the microphones of the devices that are present. In the context of video conferencing, attendees can use their device cameras to join or participate. When more than one attendee are present in one audio/video conference location, another disclosed embodiment, allows the attendees to manipulate the speaker output of their individual devices (e.g., turn on/off, turn the volume up/down) and still participate seamlessly in the audio/video conference. In another embodiment, the devices of attendees at a destination location can receive far-end audio stream(s) outputted to such devices. Multiple devices at a destination can play the stream(s) synchronously, while allowing any of the devises to change their output volume between 0 to 100%.

FIG. 1 illustrates a block diagram of an audio video conferencing (AVC) system 18 according to an embodiment. Devices 20 can include devices such as laptops, smart phones, smart watches, and tablets, which can connect to other devices 20 and/or the internet. Devices 20 can run an audio-video conferencing (AVC) app 22, which can manage the operations of the AVC system 18 along with an AVC server 24. The AVC server 24 can include additional components, such as a signal processing and selector module 26.

The AVC server 24 can detect devices 20 present in a shared physical location, such as a conference room and can build and maintain a virtual network of devices 20 in a physical location. The AVC server 24 can manage the automatic enabling and disabling of microphones, speakers and cameras of the devices 20 by sending them commands, using a set of built-in rules, designed to prevent out-of-sync perception, duplication of audio streams, echo loops and other negative auditory experiences.

Figure 2A:
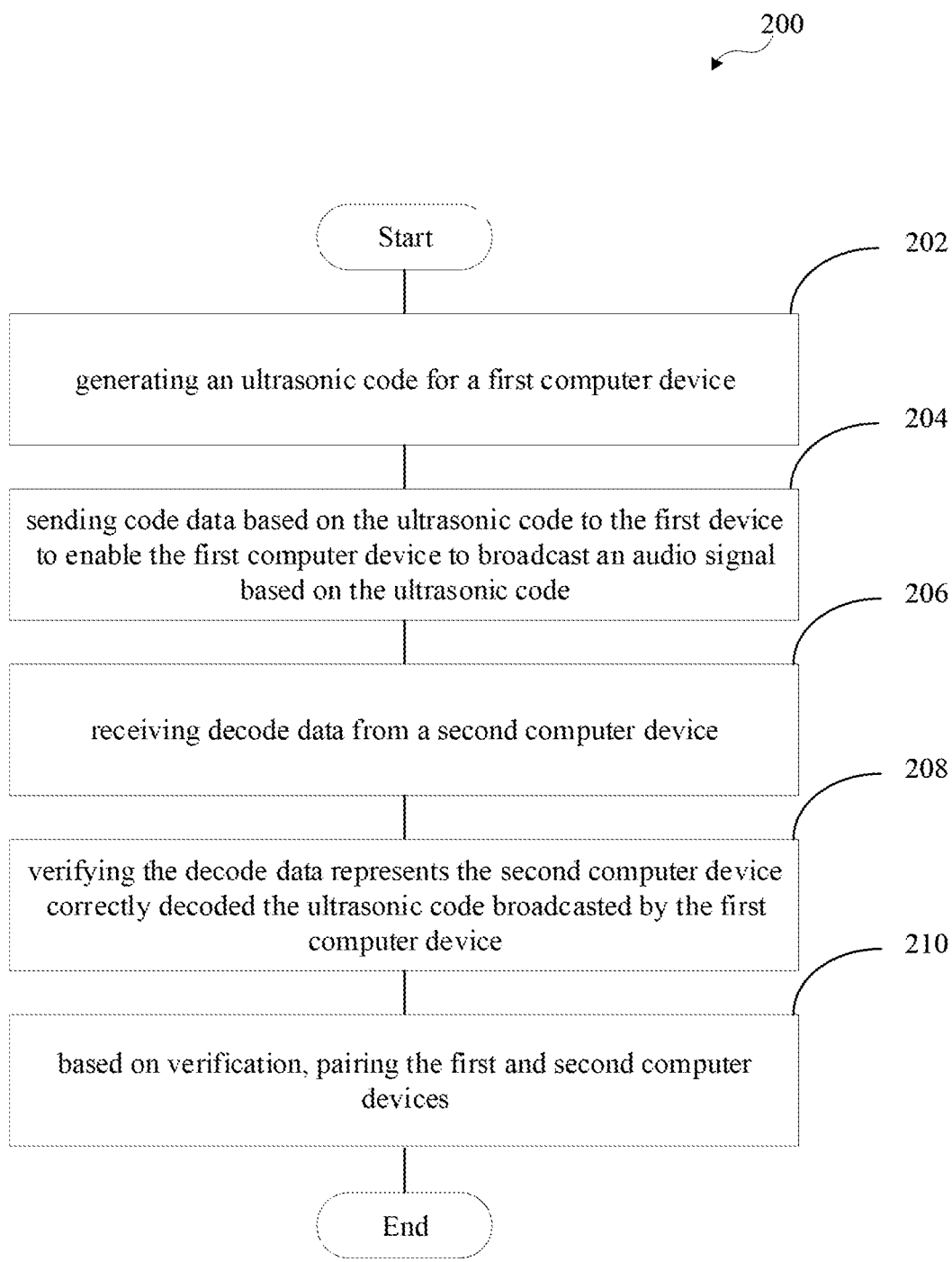
FIG. 2A illustrates a flowchart of a method for automatic identification and pairing of co-present devices near a physical location according to an embodiment(s).

Automatic Identification and Pairing of Co-Present Devices Near a Physical Location As shown in the exemplary flowchart 200 of FIG. 2A, an AVC server 24 generates an ultrasonic code for a first computer device (Act 202). For example, the AVC server 24 generates the ultrasonic code for a requesting computer device attempting to join a virtual conference currently accessed by a plurality of paired devices included in a co-present group of devices. The AVC server 24 receives first location information from the requesting device. Location information of a respective computer device is based on at least one of: a geographic location of the respective computer device and an I.P. address associated with the respective computer device. The AVC server 24 compares the first location information with respective location information previously received from one or more of the paired devices in the co-present group of devices. The AVC server 24 generates the ultrasonic code upon determining the comparison satisfies a proximity threshold.

The AVC server 24 sends code data based on the ultrasonic code to the first device (i.e. the requesting device) to enable the first computer device to broadcast an audio signal based on the ultrasonic code (Act 204). The AVC server 24 receives decode data from a second computer device (Act 206). The second computer device belongs to the co-present group of devices. The AVC server 24 verifies the decode data represents the second computer device correctly decoded the ultrasonic code broadcasted by the first computer device (Act 208). Based on successful verification, the AVC server 24 pairs the first and second computer devices (Act 210). It is understood that each act 204, 206, 208, 210 described in flowchart 200 and any feature of an example of a respective act 204, 206, 208, 210 may be combined with any aforementioned act and/or any example of the aforementioned act.

Figure 2B:
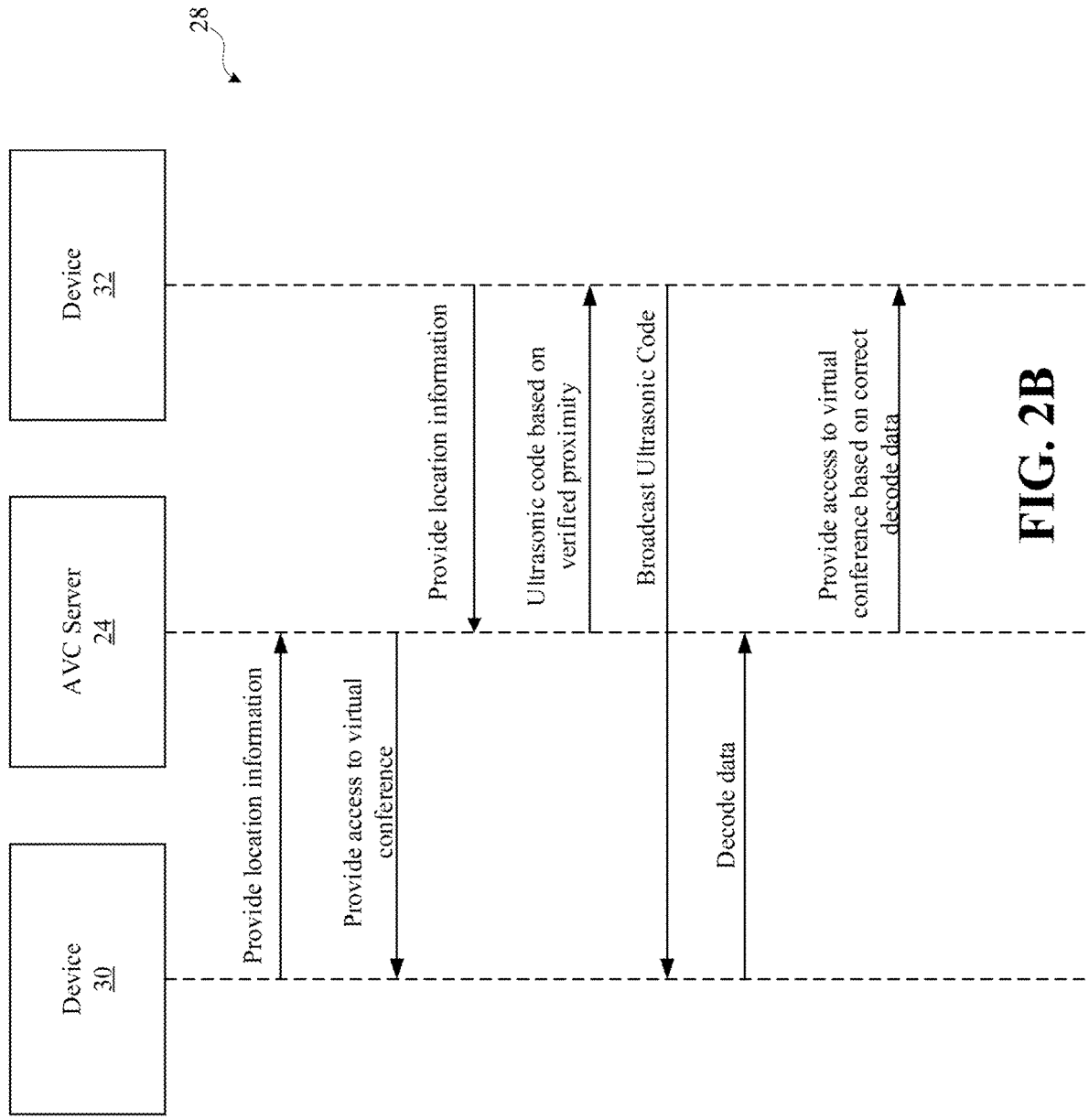
FIG. 2B illustrates a diagram for automatic identification and pairing of co-present devices near a physical location according to an embodiment(s).

FIG. 2B illustrates an example diagram 28 based on flowchart 200. A virtual conference may include (or require) attendance by multiple participants (i.e. multiple individuals) physically present at or near a physical location such that each participant's computer device (such as a laptop, mobile phone) will be present at or near the physical location and/or to each other. Instead of requiring each participant to perform a manual workflow via a graphical user interface (such as password authentication, manual log in), the AVC system 18 automatically identifies and pairs the participant's devices for concurrent participation in the same virtual conference.

According to one embodiment, a device 30 running the AVC app 22 may be the first device to join a virtual conference. The AVC app 22 of device 30 may send to the AVC server 24 first location information. Location information may be based on, for example, geo-location information and/or I.P. address. The geo-location information may indicate a current position of device 30 with respect to the physical location. The AVC server 24 receives the location information from device 30 and automatically connects device 30 to the virtual conference. The virtual conference may be associated with a list of expected attendees. In addition to the first location information, the AVC app 22 on device 30 may send first identification information that matches at least a portion of the list of expected attendees. The AVC server 24 confirms the received first identification information represents an expected attendee on the list of expected attendees and stores the location information from device 30.

Device 32 running the AVC app 22 may subsequently become physically proximate to device 30, which is the first device to join the virtual conference. The AVC app 22 of device 32 may send to the AVC server 24 second location information and second identification information. The AVC server 24 confirms the received second identification information represents another expected attendee on the list of expected attendees and stores the second location information from device 30. The second location information may be based on, for example, geo-location information that indicates a current position of device 32 with respect to a current location of device 30. The AVC server 24 compares the first location information from device 30 to the second location information from device 32. The AVC server 24 determines the comparison of location information satisfies a proximity threshold thereby representing that device 30 and device 32 are sufficiently proximate to each other. For example, the comparison of location information indicates that both devices 30, 32 are in the same physical location, such as the same meeting room.

Based on satisfying the proximity threshold, the AVC server 24 generates a unique ultrasonic code and sends code data to device 32 in order to initiate a sequence for device 32 to automatically join the virtual conference and become paired to device 30. The code data includes the unique ultrasonic code. Device 32 receives the code data from the AVC server 24 and the AVC app 22 of device 32 accesses the unique ultrasonic code in the received code data. The AVC app 22 of device 32 triggers the device 32 to broadcast an audio signal based on the unique ultrasonic code. For example, the audio signal based on the unique ultrasonic code may be encoded as a Dual-Tone Multi-Frequency (DTMF) code with frequencies above 20 kHz.

One or more microphones of device 30 receives the broadcasted ultrasonic code audio signal. The AVC app 22 on device 30 decodes the ultrasonic code and sends decode data based on the decoded ultrasonic code to the AVC server 24. The AVC server 24 receives the decode data from device 30 and verifies that device 30 properly decoded the ultrasonic code send to device 32. Based on decode verification, the AVC server 24, pairs the device 30, 32 such that they are included as part of a co-present grouping of devices in the virtual conference. According to various embodiments, if device 30 is a laptop computer, for example, the AVC app 22 on device 30 includes a linear regression algorithm to adapt for uneven frequency responses of the ultrasonic spectrum when the AVC app 22 is receiving a broadcasted unique ultrasonic code via a laptop microphone(s).

For any subsequent device(s) that joins the virtual conference, the AVC app 22 on the subsequent device sends respective location information and identification information to the AVC server 24. The AVC server 24 performs location comparison between the subsequent device's location information and the location information previously received from each paired device that is already included in the co-present grouping for the virtual conference. The AVC server 24 determines whether the subsequent device is proximate to one or more of the paired devices in the co-present grouping. According to some embodiments, there may be a requirement that the subsequent device must be near to more than one paired device. Upon satisfying the proximity threshold, the AVC server 24 generates another unique ultrasonic code and sends the unique ultrasonic code to the subsequent device as code data. The subsequent device receives the code data and broadcasts an audio signal based on the unique ultrasonic code such that it may be received by one or more of the paired devices already included in the co-present grouping for the virtual conference. One or more microphones of a paired device(s) receives the broadcasted ultrasonic code audio signal from the subsequent device. The AVC app 22 on the paired device(s) decodes the ultrasonic code and sends decode data based on the decoded ultrasonic code to the AVC server 24. The AVC server 24 receives the decode data from the paired device(s) and verifies that the paired device(s) properly decoded the ultrasonic code sent to the subsequent device. Based on successful decode verification, the AVC server 24 pairs the subsequent device with all the other paired devices included as part of the co-present grouping of devices in the virtual conference.

According to various embodiments, when the co-present grouping of devices includes a plurality of devices, the AVC server 24 selects a particular paired device to act as a primary device and all other devices in the co-present grouping are selected to act as respective secondary devices. The selected primary device may act as the primary device for a virtual conference throughout the duration of the virtual conference until the primary device logs off the virtual conference while the virtual conference is still in sessions. In such a case, the AVC server 24 detects the primary device is no longer accessing the virtual conference and selects a new primary device from the remaining secondary devices that are still currently accessing the virtual conference.

In various embodiments, a primary device is assigned a task (or role) of mixing incoming audio streams received from far-end devices that are not part of the co-present grouping. Upon mixing the incoming audio streams, the primary device sends the mixed incoming audio stream to all respective secondary devices for synchronized playback of the mixed incoming audio stream at each respective secondary device. Playback of the mixed incoming audio stream occurs at the primary device in synchronization with the playback at each respective secondary device.

As shown in diagram 29 of FIG. 2C, virtual conferencing is to be conducted using personal devices of the attendees as to any source or destination locations. The participating locations can be interchangeably source or destination depending on the direction of origination and transmission of audio from an active speaker in the virtual conference. For ease of description, we assume the devices shown in FIG. 2C are present in a source location, such as, for example, a shared physical meeting room. In the example identification method 28, a device 30 running AVC app 22 is the first device in the source location, who is attempting to join a virtual conference. The device 30 can send a request to join a virtual conference to the AVC server 24. In response, the AVC server 24 sends a command to the device 30 to broadcast a high frequency (preferably ultrasonic) signal in source location. These can be referred to as high frequency chirps or high frequency chirping signals.

The AVC app 22 in the device 30 receives the command to broadcast high frequency chirps and emits short encoded ultrasonic beeps using its speaker. In one embodiment, high frequency chirps are chosen to be of a frequency that are imperceptible to humans and pets and pose no discomfort. Additionally, the high frequency chirps are chosen not to penetrate walls and potentially broadcast to other devices in adjacent rooms, where other virtual conferences using the AVC system 18 may be ongoing. Other devices in the vicinity of the device 30, such as devices 32 and 34 can hear the broadcast chirp, decode the message and register as being together in the source location, by for example sending notifications to the device 30 and/or the server 24. For example, the notification can include device identifiers as well as meta data indicating co-location of those devices.

With successful ultrasonic pairing, each device knows about other devices and/or their respective location, automatically, without users' having to identify these devices manually. The AVC server 24 receives notifications from the attendee devices running the AVC app 22, and thus keeps a record of which participants in the virtual conference are in source location for the duration of that AVC session. Additionally, devices can notify one another to create pairings between the participant devices in the source location.

In one embodiment, the AVC server 24 can control the transmission to and/or from co-located devices to prevent or reduce the problem of acoustic echo, which can cause unpleasant auditory experience. For example, during a virtual conferencing session, the AVC server 24 can stop transmitting audio/video signals to/from some of the co-located devices to reduce unpleasant auditory experiences that can result from multiple devices playing back or transmitting the same signal.

Additionally, in some embodiments, attendees can use their respective AVC app 22 to manually change their status in a virtual conference. For example, they can join a co-located group or leave a co-located group who are in active conferencing. In other embodiments, when an attendee physically leaves or joins a co-located group, the AVC server 24 can automatically register the action as joining or leaving the virtual conference room.

Identifying the Proximity of a Speaker for Visual Communication of an Active Speaker Referring now to FIG. 1, the AVC apps 22 running on devices 20 can run a set of algorithms in real-time for the duration of an AVC session to conduct and manage the session and reduce or eliminate negative auditory experiences. These algorithms can enable a suitable (e.g., the nearest or the highest quality) microphone for an active speaker, take measures to improve the identification and activation of a suitable microphone, and reduce or eliminate echo, and other unpleasant auditory experiences.

Additionally, identification of an active speaker includes generating a visual indicator (such as an icon) that represents an identity of the active speaker. The visual indicator may be rendered on a graphical user interface for display on a device running the AVC app 22. Display of the visual indicator provides a visual cue to an end-user of a device as to which attended of the virtual conference is currently speaking. The embodiments described herein with respect to visual identification of an active speaker are an improvement over conventional systems that rely on voice activity detection and the monitoring of gain levels.

Each device (i.e. primary device and one or more secondary devices) in a co-present group of devices calculates, via an AVC app 22 running on the device, a proximity index in real time. Each device extracts a signal frame from audio obtained for its microphone(s). The device applies a windowing function on the extracted signal frame. After applying the windowing function, the device calculates a root mean square value from the signal frame and a Kurtosis maximization of speech LP residual is calculated from the signal frame as well.

The device inputs the root mean square value and Kurtosis LP residual through an averaging window of a select number of frames. For example, the select number frames may be between 5-10 frames. The device normalizes both features (i.e. root mean square value and Kurtosis LP residual) and each feature is given a corresponding weight. For example, a weight for one or more of the features may be equal to 50%. The resulting features are input into a time series smoothing algorithm (such as Weighted Exponential Moving Average). The resulting value from applying the time series smoothing algorithm is the proximity index.

It is understood that device may continually calculate and update a proximity index in real-time and send each instance of a calculated proximity index to a primary device. For example, a proximity index value may be calculated and sent to the primary device 5 to 20 times per second. The primary device continually receives the proximity index values from each secondary device and repetitively compares current proximity index values (which includes proximity index values calculated by the primary device). A proximity index value that is closest to a value of 1 amongst all the proximity index values being currently compared is selected. The respective device that calculated the selected proximity index value (i.e. value closest to 1) is designated as a device associated with an active speaker.

According to an embodiment, the AVC apps 22 can use the microphones of the devices 20 to detect whether there is human voice in the vicinity. This is to reduce or eliminate transmitting non-human voice activity, such as shuffling paper, clicking pens or other sound, which may not be relevant or interesting to the participants. If human voice activity is detected, the AVC app 22 determines a proximity value associated with the audio stream. Proximity value can include distance data indicative of the distance between source of an audio stream to the microphone receiving the audio stream. Proximity value can be expressed in different terms depending on the implementation. In one embodiment, proximity value can be a binary value, where 1 indicates near and zero indicates far. In another embodiment, proximity value can be a scaler between 0-1, where 1 indicates nearest and 0 indicates farthest. In one embodiment, audio frames are assigned proximity values.

The proximity values can be used to generate encoded audio streams having meta data including the proximity values. The proximity values can be appended to their associated audio streams as meta data, via for example, a dedicated signaling protocol, or by injecting proximity values into the associated audio streams. The encoded audio streams from each device 20 can be sent to the AVC server 24.

As an example, an attendee, named Peter, can be participating in the conference using his personal laptop. Four other attendees can also be present and joining with their laptops or smart phones. When Peter is the active speaker, Peter's laptop microphone receives an audio stream of Peter speaking. The AVC app 22 determines that the audio stream is a human voice stream, determines a proximity value (in this case a value near 1) and encodes the audio stream with this proximity value and sends this encoded audio stream to the AVC server 24. The microphones of the devices of other attendees also detect the Peter's audio stream as human voice, but because they are further away from Peter, they associate proximity values closer to 0 to the audio stream from Peter and send these encoded audio streams to the AVC server 24.

The devices 20 in a source location continuously and in real-time send their audio streams encoded with proximity values to the AVC server 24. The AVC server 24 can provide further processing and decision making and can choose a winning audio stream based on the encoded meta data in each audio stream and can forward the audio stream to destination devices, in a destination location. The AVC server 24 can additionally send a command to the AVC apps 22 in the source location to enable a microphone device associated with a winning audio stream and disable the remaining microphones.

In some embodiments, the meta data in the encoded audio streams can include additional signal quality (SQ) data, which can also be encoded along with their associated audio streams and sent to the AVC server 24. The SQ data can include information such as microphone quality and other data indicative of the measure of confidence in the quality of the associated audio stream.

The AVC server 24 receives the audio streams from devices 20 and decodes the meta data in each audio stream. Using the meta data, the AVC server 24 can compare the audio streams and choose a winning audio stream having the best or reasonably high-quality. For example, the AVC server 24 can compare the proximity values of the audio streams and choose the audio stream having the highest proximity value.

The winning audio stream can be transmitted to a destination location and participating devices therein. Additionally, the AVC server 24 can enable the microphone of the device associated with the winning audio stream and disable the remaining microphones at the same location by sending a command to the relevant AVC apps 22. The AVC session can continue until a change in active speaker is detected. Various steps of the process, described above, can be performed locally at the source destination to minimize delay. For example, human voice detection, generation of proximity values, SQ data and encoding can all be performed on devices 20. In this scenario, the AVC server 24 can quickly determine a winning audio stream (by for example, comparing proximity values and choosing the highest) and the AVC system 18 can reduce delay.

Feature Extraction to Generate Proximity Values

The AVC system 18 can utilize a variety of techniques to generate distance markings and proximity values for each audio stream. In one embodiment, a real-time audio processor can run one or more feature extraction algorithms on received audio streams to extract features that contain or correlate with distance information. For example, feature extraction algorithms can include applying a fast Fourier transform (FFT) to an audio stream, generating Kurtosis, where generating Kurtosis can include performing autocorrelation, linear prediction, and filtering a low-pass (LP) residual signal. Other algorithms that may be used as part of generating proximity values include, root mean square (RMS) and generating distance data from skewness. However, persons of ordinary skill in the art can appreciate that this list is not exhaustive and other signal and audio processing techniques can be used to determine distance of an audio source to a microphone receiving the audio.

Improving Performance of Virtual Conference System

In some situations, the AVC server 24 can erratically switch between different audio streams and their associated microphones within a short period of time. This scenario can happen when for example, group talking, laughter or double talking is encountered. A set of smoothing algorithms (e.g., implemented via weighted exponential moving average) can be deployed on the AVC apps 22 and/or the AVC server 24 to override a winning microphone for a predetermined period of time until the event causing the erratic behavior has passed. In this manner, a pleasurable and uninterrupted audible experience for the destination recipients can be accomplished.

In some embodiments, the meta data associated with each audio stream can include a volatility score. Alternatively, the volatility score can be generated at the AVC server 24. The volatility score can be generated by performing linear regression on the recent history of proximity values from a microphone of each participant and monitoring the gradient (slope) of the line. The steeper the gradient, the more volatility is detected in regard to a microphone, and the AVC server 24 can decide to switch to a less volatile microphone.

In another embodiment, visual speaking cues, such as tracking lip movements, can be used to provide confirmation or secondary information for identifying an active speaker whose nearest microphone should be activated. In some embodiments visual speaking cues can be used as tiebreaker between audio streams of the same quality and meta data. For example, participant A's microphone might return an audio stream having proximity value 0.8, while participant B's microphone, located 2 feet away from participants A, also returns an audio stream with the same proximity value 0.8. This scenario can cause an erratic switching back and forth between the participant A's microphone and participant B's microphone. To address this situation, a video feed from each participant can also be simultaneously analyzed for visual cues. If participant A's lips are not moving, participant B is the active speaker and her microphone is activated and participant A's microphone is disabled.

Another method of improving the accuracy of the decision-making process at the AVC server 24 includes individual speaker recognition and identification. Participants can record samples of their voice via their AVC app 22 and submit their voice samples to the AVC server 24. The AVC server 24 can use the sampled voice data to train an artificial intelligence (AI) model (e.g., a neural network optimized for performing classification of speech). The trained AI model can be used in real time to recognize a speaker associated with an audio stream. The recognition can be used as an additional piece of data that can help the AVC server 24 pick a winning audio stream, process tie breakers and activate the corresponding microphone. In some embodiments, given an input audio stream, the trained AI model can output a probability parameter, comprising the likelihood that the audio stream belongs to a participant.

As described above, the AVC apps 22 and the AVC server 24 can have proximity values, visual speaking cues, and speaker recognition data, in order to choose a winning audio stream. These techniques are described as example algorithms the AVC system 18 can utilize to identify a high-quality audio stream and activate the associated microphone. These techniques can be used alone or in combination with one another.

Audio Playback at Destination

The winning audio stream is sent to one or more destination devices in a destination location. Destination devices are independently connected to the internet and can experience varying latencies, from a few milliseconds to a few hundred milliseconds. Human hearing can be sensitive to the same audio stream, playing at different variances. Generally, above a certain threshold, human auditory system can perceive these variances and find the conferencing performance to be poor and distracting. The variance perception threshold (VPT) for the human ear is approximately 30 milliseconds (ms). Audio variances more than 30 ms can be perceptible to human ears and create a negative auditory experience.

One method to address this issue is to play the incoming audio through the speakers of a single device. One destination device can be chosen by the AVC server 24 based on criteria, such as its processing resources, including battery life, the quality of its speaker and the strength of its connection to the internet. The speaker of the chosen destination device can be used as a single primary loudspeaker and all other speakers of the devices of the destination location (secondary device speakers) can be disabled during the playback of the incoming audio. Alternatively, the other destination devices do not receive the incoming audio stream.

Another method of audio playback at the destination location can be accomplished by creating a real-time transport protocol (RTP) local network amongst the destination devices. A primary device in the RTP network receives the incoming audio stream and distributes the audio stream to other destination devices (secondary devices). In this approach, when the far-end participants speak, incoming audio to the destination can be played on one, some, or all the destination devices. Nonetheless, a problem of variable latency between destination devices during playback can degrade the auditory and playback experience at destination. While the local latency of a non-interfered Wi-Fi network is typically below 2 ms, which is far below the variance perception threshold (VPT) of humans (<30 ms), the delays and latencies can in some cases, exceed this threshold.

Synchronization of Audio Playback of Incoming Streams Received from Far-Ends

Figure 3A:
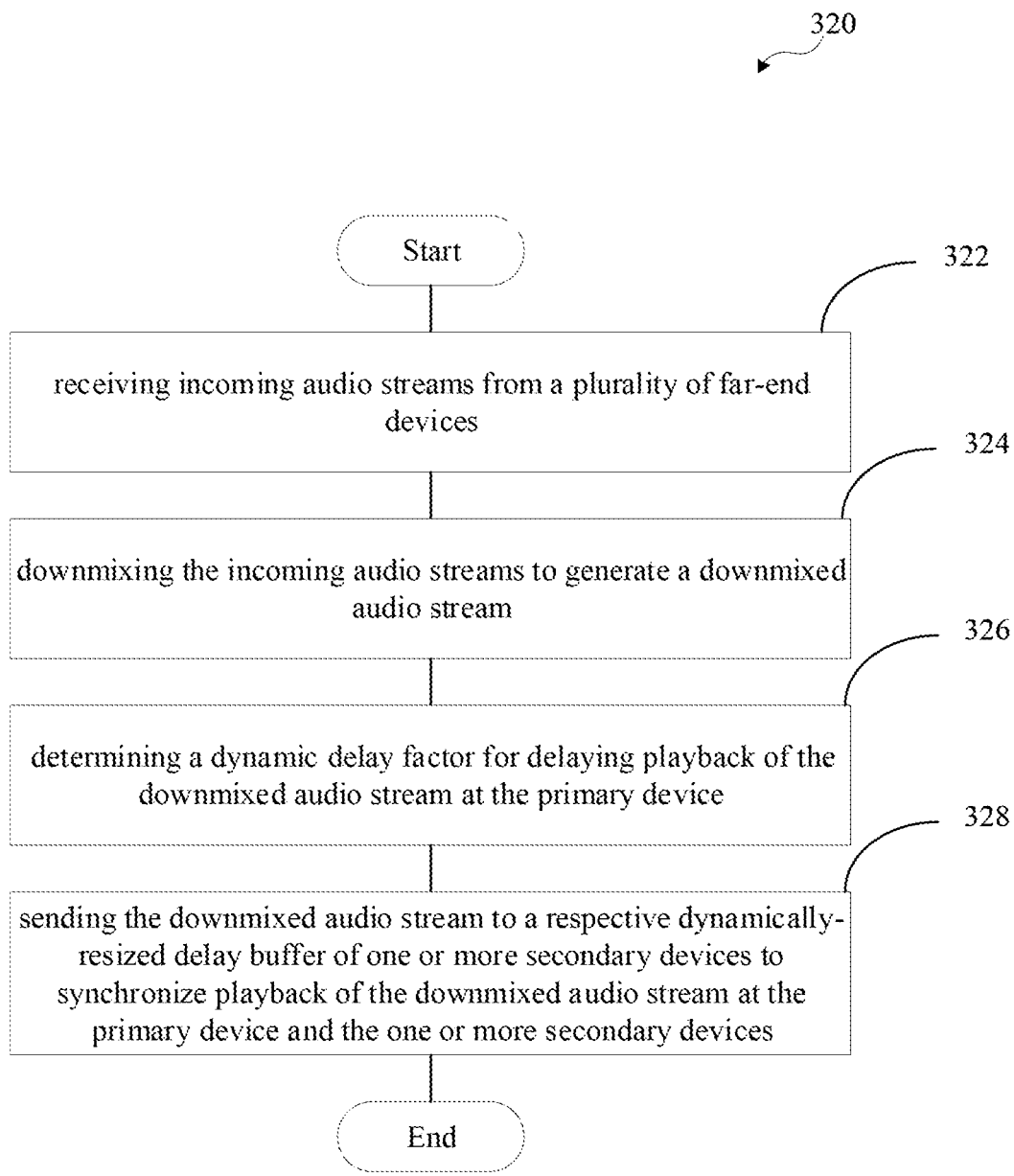
FIG. 3A illustrates a flowchart of a method for synchronization of audio playback of incoming audio streams received from far-end devices according to an embodiment(s).

As shown in the exemplary flowchart 320 of FIG. 3A, a primary device receives incoming audio streams from a plurality of far-end devices (Act 322). The primary device downmixes the incoming audio streams to generate a downmixed audio stream (Act 324). The primary device determines a dynamic delay factor for delaying playback of the downmixed audio stream at the primary device (326). For example, the primary device determines the dynamic delay based at least on one or more buffer characteristics, wherein each respective secondary device is associated with a particular dynamically-resized delay buffer having at least one buffer characteristic. For example, the primary device determines the dynamic delay for playback at the primary device based on a time range between 50 to 250 milliseconds.

The primary device sends the downmixed audio stream to a respective dynamically-resized delay buffer of one or more secondary devices to synchronize playback of the downmixed audio stream at the primary device and the one or more secondary devices (Act 328). According to various embodiments, prior to sending the downmixed audio stream, the primary device dynamically resizes a first buffer and a second buffer, whereby the first and the second buffers are each associated with a different secondary device. For example, the primary device dynamically resizes a respective buffer by calculating, for each respective buffer, a dynamic buffer size based on compensating for: (i) an amount of time for the primary device to encode at least a portion of the downmixed audio stream, (ii) an amount of time for a corresponding secondary device to decode at least the encoded portion of the downmixed audio stream and (iii) a current round trip time of network latency. For example, the primary device dynamically resizes a respective buffer by calculating, for each respective buffer, the dynamic buffer size based on compensating for at least one of: an operating system type of the corresponding secondary device, a type of hardware present at the corresponding secondary device, a type of playout delay at the corresponding secondary device and an active playback mode at the corresponding secondary device. It is understood that each act 324, 326, 328 described in flowchart 320 and any feature of an example of a respective act 324, 326, 328 may be combined with any aforementioned act and/or any example of the aforementioned act.

Figure 3B:
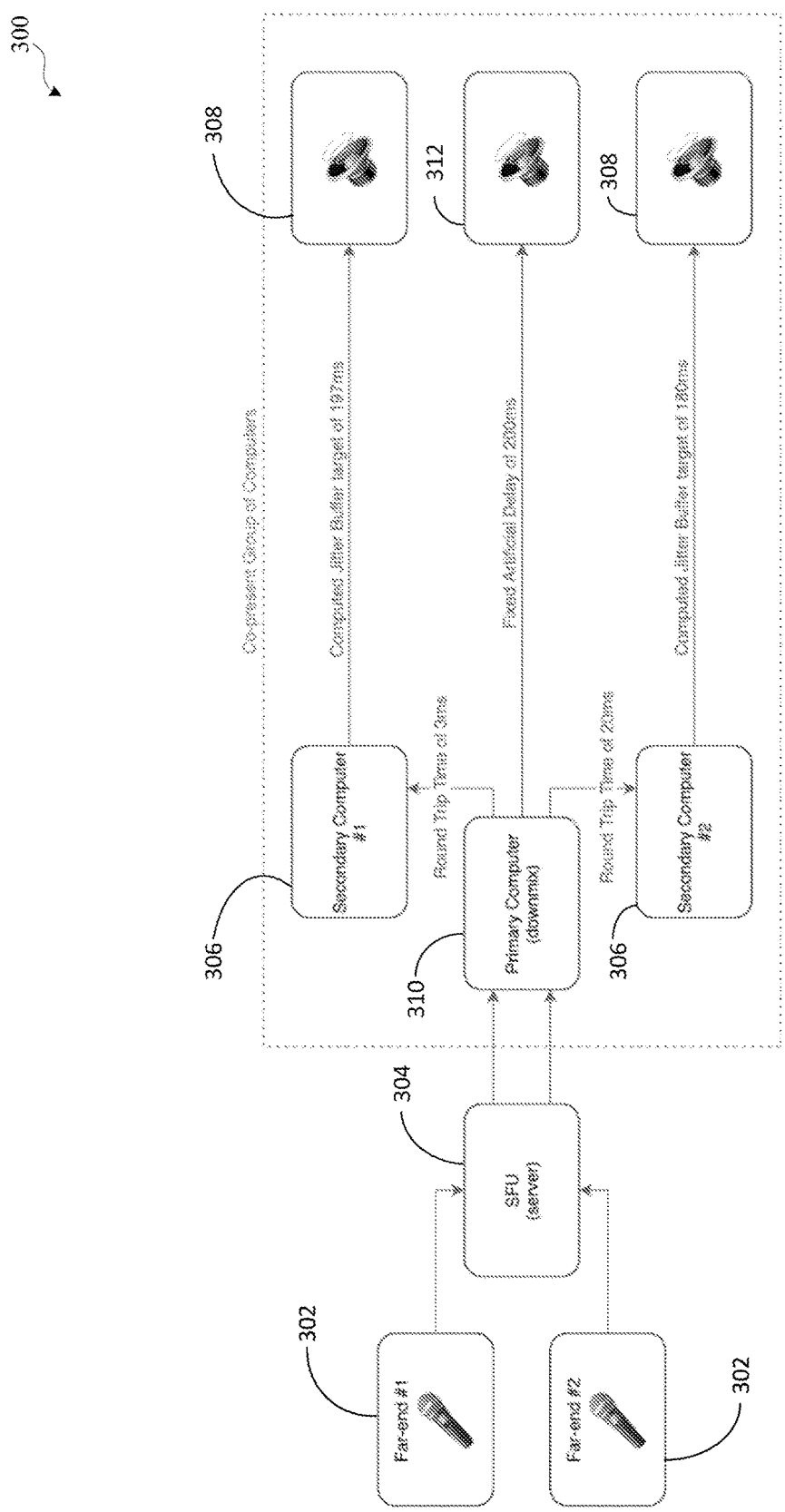
FIG. 3B illustrates a diagram of an audio playback system according to an embodiment.

As shown in FIG. 3B, when devices are independently connected to a wireless network, such as a local wireless network, their data transfer latency amongst the connected devices to the wireless network and to the router establishing the wireless network can vary in general and in some cases can even vary at different times of day. The data transfer latency can be a dynamic parameter due to a variety of factors, such as the general state of traffic in a wireless network, individual device's varying processing speeds, resources and wireless communication capabilities. As a result, simultaneous audio playback of an incoming audio stream(s) from far-end devices 302 by co-present devices 306, 310 in such wireless networks can be offset from one another by a parameter, which can be termed, a desync factor. The desync factor can be a dynamic parameter, changing with time and based on when it is measured, it can show different values. In addition, most devices 306, 310 connected to a wireless network, may utilize a jitter buffer. The jitter buffer can be a temporary storage buffer used to capture incoming data packets. It can be used in packet-based networks to preserve or increase the continuity of audio streams by smoothing out packet arrival times during periods of network congestion or at other times. Different devices can use various dynamic jitter buffers to handle the incoming audio according to their varying delay parameters, and therefore, they can contribute to an increase in the desync factor.

FIG. 3B illustrates a diagram of an audio playback system 300 according to an embodiment. The system 300 can reduce or eliminate the desync factor during simultaneous playback of an incoming audio stream(s) from far-end devices 302 when a wireless communication network is used. For example, each far-end devices 302 may be sending an audio stream based on audio data for its own microphone. Source devices 302 (i.e. the far-end device) transmit their audio signals to an SFU (selective forwarding unit) server 304. The SFU server 304 can be an implementation of the AVC server 24. A primary device 310 is chosen among the destination devices that are each included in a co-present grouping of devices and are co-located at a same physical location. The primary device 310 can be chosen from amongst the co-present grouping of devices by the AVC server 24 based on a variety of factors, such as hardware specification, including processing power, wireless communication capability, battery life, or based on any other factor that would indicate the primary device 310 is to act as a master device, via an AVC app 22 running on the primary device 310, for handling the management of the incoming audio stream(s) playback operations competently. In one embodiment, the incoming audio streams from the source devices 302 is sent only to the primary device 310 and the primary device 310 downmixes the incoming audio streams from the source devices 302 into a single downmixed audio stream. The primary device 310 distributes the downmixed audio stream to the all other devices 306 in the co-present grouping of devices.

The primary device 310 applies a dynamic delay to its own playback of the downmixed audio stream to account for any delay that will be experienced by each secondary device 306 that accrues as an instance of the downmixed audio stream is transmitted to the respective secondary device 306 and processed for playback by the secondary device 306. For example, the primary device may apply a dynamic delay of 200 milliseconds (ms) to its own playback of the downmixed audio stream. According to various embodiments, the dynamic delay may fluctuating between 50 ms to 250 ms depending on a current state of one or more delay parameters and/or playback parameters. For example, the primary device 310 can, continuously, intermittently or otherwise, measure, monitor or receive various local and/or network latencies and dynamically adjust the dynamic delay based on playback parameters, including jitter buffers on other destination devices 306 (secondary devices 306) to reduce or minimize the desync factor, during simultaneous playback, and make the playback more synchronous such that when the downmixed audio stream is played back at each device 310, 306, the audio of each devices 310, 306 playback will be synchronized. Such synchronization results in a pleasant user experience given that unsynchronized playback of the same audio by many devices that are physically near each other creates an experience of hearing echoes and/or overlapping segments of the same audio.

Upon downmixing the incoming audio streams, determining the dynamic delay and applying to the dynamic delay to its own playback, the primary device 310 sends the downmixed audio stream to each secondary device 306. The primary device 310 places an instance of the audio stream in a respective buffer for each secondary device 306. For example, a buffer may be a First-In-First-Out (FIFO) buffer for insuring one or more portions of the downmixed audio stream may be available for playback by a secondary device 306 despite a temporary lack of network capacity and/or network reliability (i.e. poor network connectivity). According to various embodiments, the buffer may have a variable size computed by either the primary device 310 and/or a secondary device 306 according to, for example: dynamic delay—rtt/2—encoding time—decoding time. The "rtt" represents the roundtrip time of network latency. The encoding time may be an amount of time required for the primary device 310 to encode the downmixed audio stream before it is sent to a secondary device 306 and the decoding time may be the amount of time required for a secondary device 306 to decode the received encoded downmixed audio stream. According to various embodiments, the variable buffer size may be computed according to other factors and variables based on, in part: device operating system type, specific types of hardware present at a device, a type of playout delay and/or playback modes.

The AVC app 22 may further trigger the primary device 310 to perform one or more algorithms to correct for various time drifts and other various similar situations such as, for example: buffer underrun and/or missing network packets by synchronizing audio playback according to an audio frame time(s), network packet absolute time(s) passed in packet headers and/or implementation of an arbitrary clock synchronization mechanism.

It is understood that small variations may occur such that audio playback may not be completely, totally synchronized but still not perceptible to the human ear. Such small variations that lead to a minimal amount of desynchronization may be processed according to, for example, Acoustic Echo Cancellers.

According to another embodiment may be described by FIG. 3B. the variable buffer size may be computer according to other factors and variables based on, in part: device operating system type, specific types of hardware present at a device, a type of playout delay and/or playback modes in which an artificial delay is established across the whole system. The delay is long enough to cover most common issues on typical wireless or wired networks, but short enough to ensure or optimize as much as possible the near real-time nature of the communication within the system 300 and/or the AVC system 18. In one embodiment, the artificial delay can be somewhere between 100-300 microseconds (ms). In some cases, the system may or may not be able to adjust the artificial delay based on the network quality, capacity and processing capacity of the receiving secondary devices.

The primary device 310 can handle incoming audio signals from the SFU server 304 by processing the audio signals. The processing at this step can include (but is not limited to) decoding or downmixing of the audio signals (e.g., in case there are multiple source participants talking on their respective source devices at the same time). The processing can also include combining two or more audio signals into a playback audio signal by for example encoding the audio signals into a playback audio signal. The primary device 310 can send the playback audio signal via the local RTP connections to the secondary devices 306. While two secondary devices 306 are shown, fewer or more secondary devices are also possible.

Furthermore, the primary device 310 can schedule the playback audio signal to be played on the destination devices (including the primary device itself). The primary device can schedule its playback time after the artificial delay minus the "Actual Hardware Device Playout Delay" (AHDPD) period of time, to give time to all secondary devices 306 to receive the playback audio signal and prepare it for the actual playout on their side.

The secondary devices 306 can handle the incoming audio playback signal received from the primary device 310 by performing various steps. For example, the secondary devices 306 can decode the playback audio signal. A secondary device 306 can also estimate a delay parameter from the moment it was scheduled for playback on the primary device 310 to the present moment. The following metrics can contribute to the delay parameter and can be calculated, monitored or otherwise acquired: encoding and generating of the audio playback signal on the primary device 310, algorithmic delay (buffers) used to send the playback audio signal out to secondary devices 306, actual network round trip time, algorithmic delay (buffers) used to receive and decode the playback audio signal on the secondary device 306, current jitter buffer delay, Actual Hardware Device Playout Delay (AHDPD), and other algorithmic delays that could contribute in case other systems are used to process the audio (e.g. providing the audio signal from WebRTC to Web Audio). One or more of the above metrics can be monitored or properly calculated to estimate the delay parameter in near-real-time.

The resulting delay parameter can be used in two different ways. In one embodiment, the estimated delay parameter can be used to create an artificial delay similar to the system-wide delay implemented on the primary device 310, that can reduce the computed delay above, achieving a synchronized audio playout. In another embodiment, the estimated delay parameter can be used to take the jitter buffer out of the equation and use it as a means to achieve an artificial delay on the secondary devices 306.

In a preferred embodiment, using jitter buffers yields better results in terms of playout stability and also perception quality, since jitter buffer can typically handle slowdowns and speed-ups of the playback should the system need to adjust the artificial delay target level due to other metrics changing in real-time. Algorithms such as weighted exponential moving average or similar could be implemented to ensure or increase the chance that jitter buffers and dynamic delays do not change erratically and abruptly, due to random spikes in the measured, monitored or calculated metrics, and a smooth playback experience can be achieved.

In some embodiments, it is also possible to change the primary/secondary roles within a group of devices in real-time, without substantial audio disruption. This may be used if the primary device 310 is disconnect from the virtual conference on purpose or if there should be any measurable problems happening that may suggest any kind of call quality degradation.

In real world applications, since any of the metrics measured above, or their combination can spike unexpectedly, this situation can be handled in a variety of ways. For example, in some embodiments, the target artificial delay may be increased in one or more of the primary and secondary devices to accommodate for any such unexpected situation. Additionally, if any secondary device 306 is unable to keep up with the audio playback within the target artificial delay with all the other devices in the co-present group, the audio playback in that secondary device can be muted to prevent or reduce the chance of an audible out-of-sync playout situation. In this scenario, the affected device can monitor one or more of the available metrics and can unmute the audio once the system stabilizes again.

Another method of audio playback at the destination location can utilize a semi-synchronized play back method. The AVC server 24 can maintain a universal timer. Destination devices can synchronize their internal timers or clock signals with this universal timer at the AVC server 24. Additionally, the destination devices can build a tolerance buffer of up to the human variance perception threshold (approximately 20 ms). The AVC server 24 can time stamp the winning audio stream and transfer to all destination devices, with instructions to play back the winning audio stream, only if paly back can be accomplished within a period of time less than the human variance perception threshold, relative to the time stamp of the winning audio stream. A device's ability to timely play back incoming audio streams can be evaluated multiple times per second. If a destination device receives the winning audio stream too late for timely paly back, the AVC app 22 drops that audio stream and temporarily disables the speaker of the device. If latency becomes too unpredictable and disabling speakers becomes too frequent, the play back method falls back to backup mode where a single master loudspeaker can be used as described above.

Alternative Embodiments

In one embodiment, an adaptive, time-variant, non-linear echo cancelation engine can be used to improve the performance of the AVC system 18. The engine can be deployed server-side, client-side or both.

In another embodiment, audio streams from more than one microphone can be received at the AVC server 24. The audio streams from all or some of the source microphones can be mixed. A server buffer can be used to align the audio streams and resolve their latency to generate a mixed track signal. The resulting mixed track signal can be sent to destination devices.

In another embodiment of the source operations, a local peer-to-peer wireless connection between the devices 20 can be created. The AVC server 24 can choose a master mixer device from amongst devices 20 based on criteria, such as processing resources, strength of wireless connection, battery charge level, etc. The master mixer device can receive audio streams from the other devices 20 and can mix them into a synchronized audio stream. The synchronized audio stream can be sent to the AVC server 24 and/or to destination devices.

Devices connected to a wireless connection send and receive audio streams with varying latencies. As a result, the master mixer device receives the same audio stream from various source devices 20 with varying latencies. A synchronization time buffer of a predetermined duration (e.g., 100 ms) can be created on the master mixer device, where the master mixer device can wait for streams from the other source devices 20 and can overlap them using cross-correlation algorithms. Alternatively, the primary device can measure recording differences based on measurements or monitoring of stream latencies, encoding latencies, network latencies, decoding latencies and jitter buffer configurations, in order to synchronize the incoming streams from various microphones properly. Additionally, the incoming audio streams from other source microphones can include meta data, such as proximity values, as described above. Audio streams having poor signal quality, as indicated by meta data (e.g., low proximity value, or having reverberate) can be discarded and not included in the mix synchronized audio stream. The mixed synchronized audio stream can then be sent to destination location and destination devices for playback.

Figure 4A:
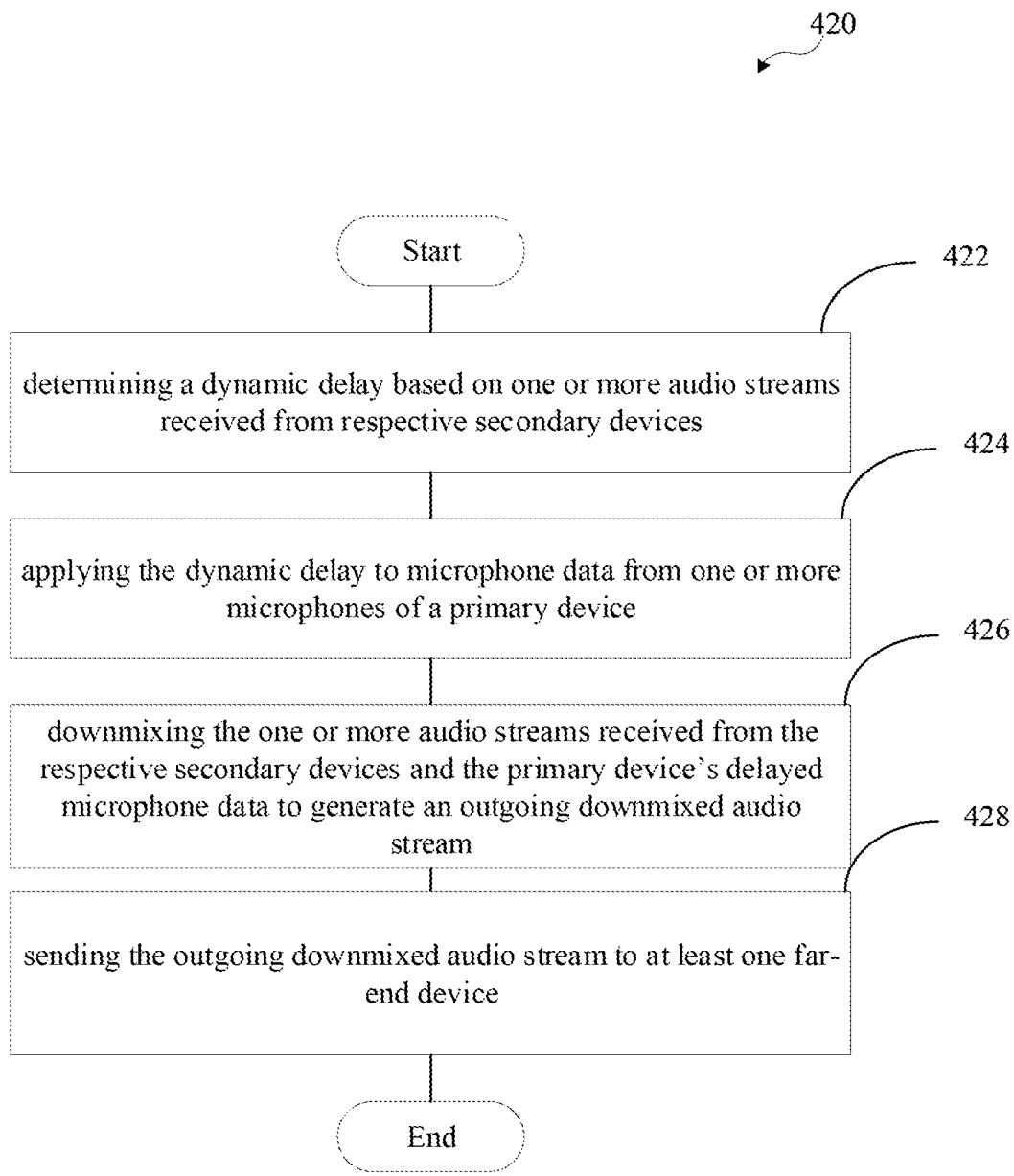
FIG. 4A illustrates a flowchart of a method for synchronization of co-present microphones for an outgoing stream sent to far-end devices according to an embodiment(s).

Synchronization of Co-Present Microphones for Outgoing Stream Sent to Far-End Devices FIG. 4A illustrates a flow chart of a method 420 for synchronization of co-present microphones for outgoing stream sent to far-end devices according to an embodiment(s).

A primary device determines a dynamic delay based on one or more audio streams received from respective secondary devices (Act 422). For example, the primary device receives the one or more audio streams from one or more dynamically-resizable buffers, where each dynamically-resizable buffer corresponding to a respective secondary device. The primary device determines the dynamic delay based in part on a current size of at least one dynamically-resizable buffer. According to one embodiment, primary device determines the dynamic delay based on an average of delays experienced by the audio streams. That is, each audio stream experiences a particular delay related to a current size of a dynamically-resizable buffer through which it was sent.

The primary device applies the dynamic delay to microphone data from one or more microphones of the primary device (Act 424). The primary device downmixes the one or more audio streams received from the respective secondary devices and the primary device's delayed microphone data to generate an outgoing downmixed audio stream (Act 426). The primary device sends the outgoing downmixed audio stream to at least one far-end device (Act 428).

It is understood that the primary device and the one or more secondary devices belong to a co-present group of devices proximate to each other with respect to a same physical location. Furthermore, the primary device and the one or more secondary devices are concurrently accessing a virtual conference while present at the same physical location. Each far-end device is concurrently accessing the virtual conference as well but is remotely located away from the same physical location of the co-present group of devices. It is understood that each act 424, 426, 428 described in flowchart 422 and any feature of an example of a respective act 424, 426, 428 may be combined with any aforementioned act and/or any example of the aforementioned act.

Figure 4B:
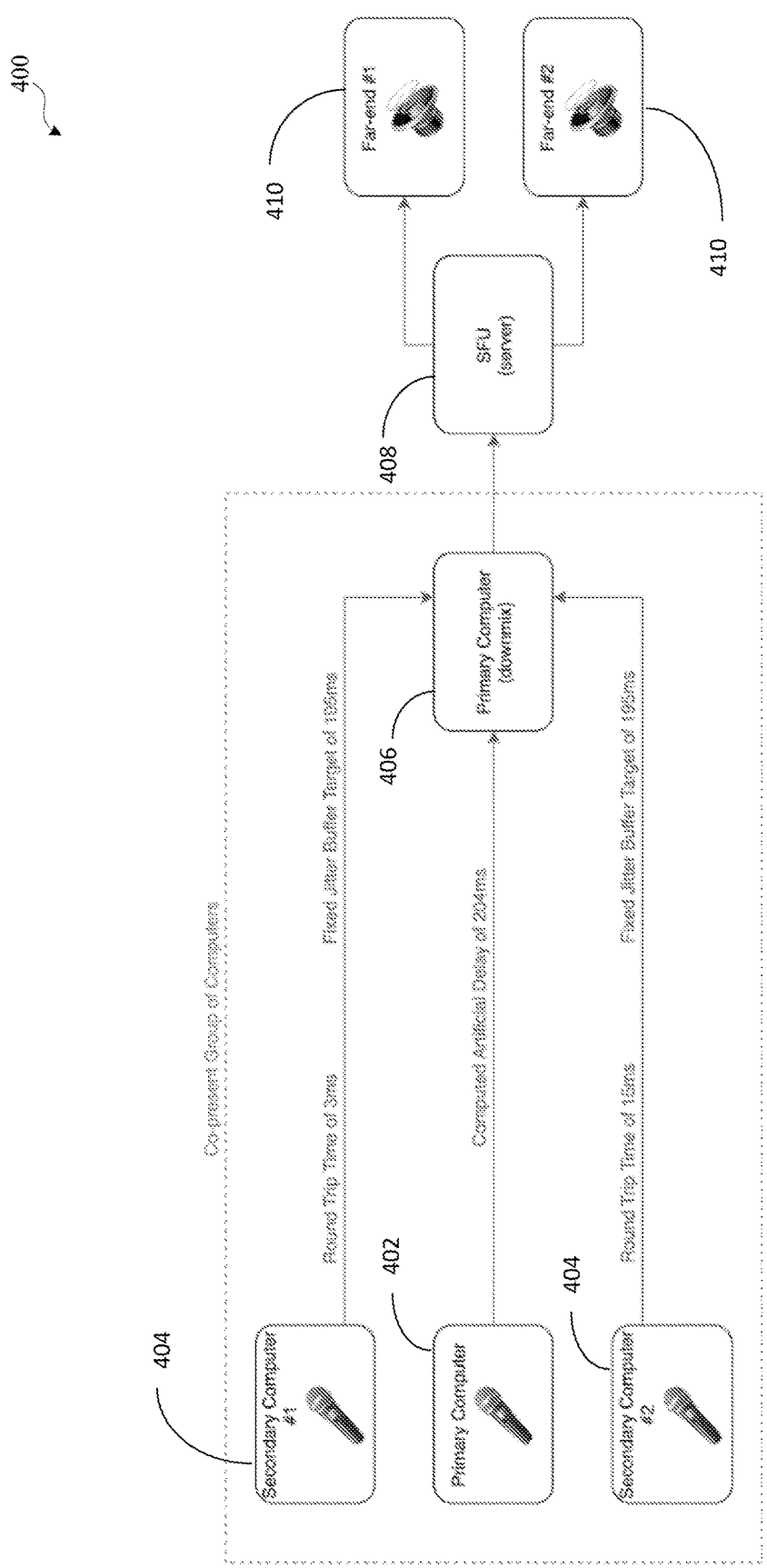
FIG. 4B illustrates a diagram of a source system which can generate and transmit a synchronized audio signal to a destination.

In one embodiment, the auditory experience of a virtual conference may be improved by sending a synchronized outgoing audio stream from the source location. FIG. 4B illustrates a diagram of a source system 400, which can be used in the AVC system 18 in order to generate and transmit a synchronized audio signal to a destination, such as one or more far-end devices 410. The system 400 includes co-present group of devices 402 and 404, where a particular device 402 acts as (i.e. performs the processing of) a primary device of the co-present group of devices. It is understood that a co-present group of device may include any number of devices and is not limited to two devices as illustrated in FIG. 4B.

According to one or more embodiments for merging audio signals of the co-present group of devices prior to sending an outgoing audio stream to the far-end devices 410, each respective secondary device 404 sends microphone(s) audio data to the primary device 402. Such audio signals may represent sounds occurring at a physical location, such as a meeting room, at which the co co-present group of devices are physically present. As such, there may be multiple persons speaking and in some cases such speaking may be overlapping and/or interrupted with various types of background noise. Merging audio signals of the co-present group of devices into an outgoing audio stream for transmission to the far-end devices 410 results in the far-end devices 410 receiving audio from the co-present group of devices that is synchronized and more pleasant to hear and easier to understand.

Each secondary device 404 may obtain its microphone(s) data by auto gain control, acoustic echo cancellation and/or noise suppression. Each secondary device 404 microphone signal may be sent over a local network connection. In some embodiments, a secondary device 404 may encode its microphone signal prior to transmission to the primary device 402. Each secondary device 404 sends its microphone audio data to a respective buffer, such as a FIFO buffer, without incorporating any delay with respect to the microphone audio data. Each buffer that receives secondary device microphone data is similar to the buffer (s) described with respect to FIG. 3B. Each buffer in FIG. 4B can be similarly dynamically-resized as the buffers in FIG. 3B. According to various embodiments, the buffers in the FIG. 3B are the same buffers in FIG. 4B such that each buffer may be dynamically resized and behave bidirectionally for sending a downmixed audio signal from a priority device to one or more secondary devices and also sending a microphone data audio signal from a secondary device to the primary device. With respect to sending microphone data audio signals to the primary device, a computing a size of a buffer may further be based, in part, on one or more delays in obtaining the microphone signal at a corresponding secondary device.

The primary device 402 also obtains an audio signal from its microphone(s). The primary device 402 adds a delay to its microphone data audio signal based on an average of the audio delays present in the audio signals sent from the secondary devices 404, whereby an audio delay from a secondary device 404 is based, at least in part, on a size of its corresponding buffer. Delay of the primary device's 402 microphone audio signal afford enough time for the primary device 402 to receive the audio signals sent from the secondary devices 404 that each have also experienced a delay. The primary device 402 downmixes the secondary device microphone data audio signals and its own microphone data audio signals into an outgoing audio stream. The primary device 402 then transmits the downmixed outgoing audio stream from the co-present group of devices to the far-end devices 410 via a server 408.

According to an embodiment, a wireless network connection between the source devices 402 and 404 can be established. In one embodiment, the wireless connection network can be a peer-to-peer wireless connection network between co-located, or co-present devices 402 and 404. A primary mixer device 402 can be chosen from amongst the co-present source devices, based on hardware specification, such as processing power, CPU power, wireless communication speed and bandwidth, battery charge level, or based on other hardware, software or environmental criteria (e.g., in some embodiments, a device that is better positioned to receive audio streams can be chosen to be the primary device 402). One or more other co-present devices can be the secondary devices 404. At block 406, the primary device 402 receives the audio signals from its microphone and the microphones of secondary devices 404 and combines the microphone audio signals into a transmission audio signal. In one embodiment, the combining the audio signals into a transmission audio signal, includes downmixing the microphone audio signals into a synchronized or nearly synchronized audio stream. The transmission audio signal is transmitted to a server (such as SFU server 408). The SFU server 408 is an example implementation of the AVC server 24. The SFU server 408 can transmit the transmission audio signal to one or more destination devices 410 according to the various embodiments, described herein.

The wireless connection between source devices can have or can introduce variable latencies. The primary device 402 can synchronize (adjust for latency offsets or delays) the separate microphone streams by performing one or more operations. Synchronization operations can include, for example, establishing a system-wide artificial delay across the AVC system 18. The delay is long enough to cover most common issues on typical wireless or wired networks, but short enough to ensure or optimize as much as possible the near real-time nature of the communication within the system 400 and/or the AVC system 18. In one embodiment, the artificial delay can be somewhere between 100-300 microseconds (ms). In some cases, the system may or may not be able to adjust the artificial delay based on the network quality, capacity and processing capacity of all the secondary devices 404 or the receiving primary device 402.

In some embodiments, the secondary devices 404 can encode and send their microphone audio signals to the primary device 402 in the co-present group via the local RTP connection. The primary device 402 can handle the incoming audio signal from the secondary devices 404 by performing a variety of operations, including for example, by decoding the audio signals, estimating a delay parameter from the moment it was captured by the microphone on the secondary computers to this moment (of what the primary device 402 can capture by its own microphone). Furthermore, the following metrics can contribute to the delay parameter: processing (DSP) and encoding of the audio signal on the secondary devices 404, algorithmic delay (buffers) used to send the audio signals out to primary device 402, actual network round trip times, algorithmic delay (buffers) used to receive and decode the audio signals on the primary device, current jitter buffer delays of each receiver, and other algorithmic delays that could contribute in case other systems are used to process the audio (e.g., providing the audio signal from WebRTC to Web Audio).

In some embodiments, the jitter buffer target level of each receiver can be stabilized, and thus it can be used as a more or less fixed delay element in the system to accommodate for larger discrepancies in the monitored metrics of the participating secondary devices 404 and to ensure similar delays in the received audio signals from the secondary devices 404. The above metrics can be properly monitored and/or calculated to estimate the delay parameter in near-real-time.

The resulting delay parameter can be used to generate an artificial delay on the primary device 402 that can be applied against its own microphone audio signal. This can achieve the primary device's microphone being in-sync with the other incoming audio signals from the secondary devices 404. The microphone audio signals from the source devices 402 and 404 can be combined (e.g., via downmixing) into one synchronized signal, encoded and sent to the SFU server 408.

Algorithms such as weighted exponential moving average or similar could be implemented to ensure or increase the chance that jitter buffers and dynamic delays do not change erratically and abruptly, due to random spikes in the measured, monitored or calculated metrics, and a smooth playback experience can be achieved.

Additionally, audio streams having poor signal quality (SQ), low proximity index values, or out-of-sync situations caused by any secondary devices 404 containing reverberations, echo or other effects that can otherwise produce deteriorated auditory experience can be reduced in volume or altogether ignored and not included in the synchronized audio stream (e.g., downmixed signal) sent to destination. As a result, the auditory experience in the destination is improved. The synchronized downmixed microphone track can be sent as one single track to the SFU server 408 to be consumed by the listening far-end devices 410 according to the various embodiments described herein.

Source and Destination Improved Virtual Conferencing Example Flow Charts

Figure 5:
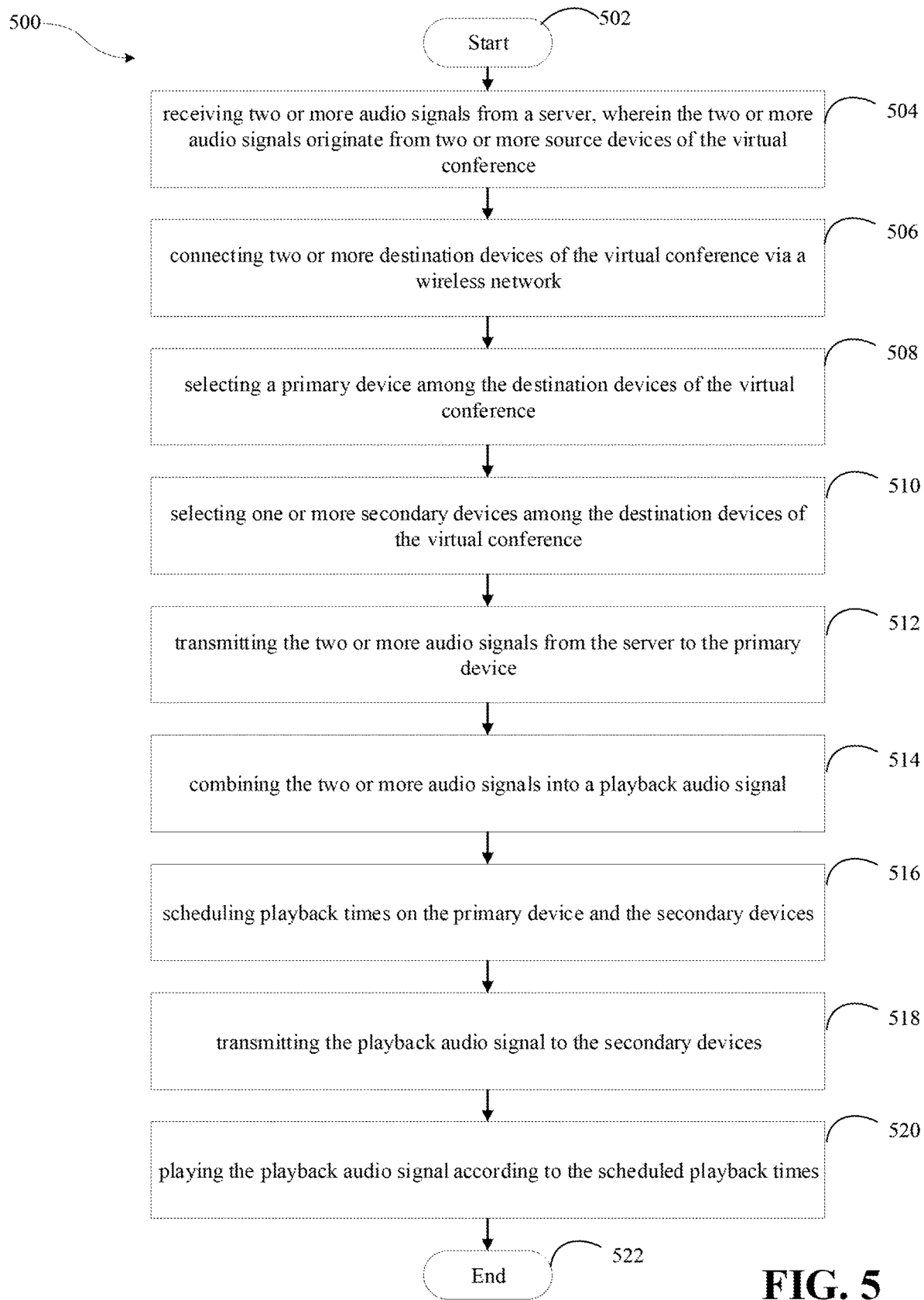
FIG. 5 illustrates a flowchart of a method of an improved audio playback in a virtual conference system according to an embodiment.

FIG. 5 illustrates a flow chart of a method 500 of an improved audio playback in a virtual conference system according to an embodiment. The method 500 starts at step 502. The method moves to the step 504 by receiving two or more audio signals from a server, wherein the two or more audio signals originate from two or more source devices of the virtual conference. Next step 506, includes connecting two or more destination devices of the virtual conference via a wireless network. Next step 508 includes selecting a primary device among the destination devices of the virtual conference. Next step 510 includes selecting one or more secondary devices among the destination devices of the virtual conference. Next step 512 includes transmitting the two or more audio signals from the server to the primary device. Next step 514 includes combining the two or more audio signals into a playback audio signal. Next step 516 includes scheduling playback times on the primary device and the secondary devices. Next step 518 includes transmitting the playback audio signal to the secondary devices. Next step 520 includes playing the playback audio signal according to the scheduled playback times. The method ends at step 522. It is understood that each step 504, 506, 508, 510, 512, 514, 516, 518, 520 described in flowchart 500 and any feature of an example of a respective step 504, 506, 508, 510, 512, 514, 516, 518, 520 may be combined with any aforementioned step and/or any example of the aforementioned step.

Figure 6:
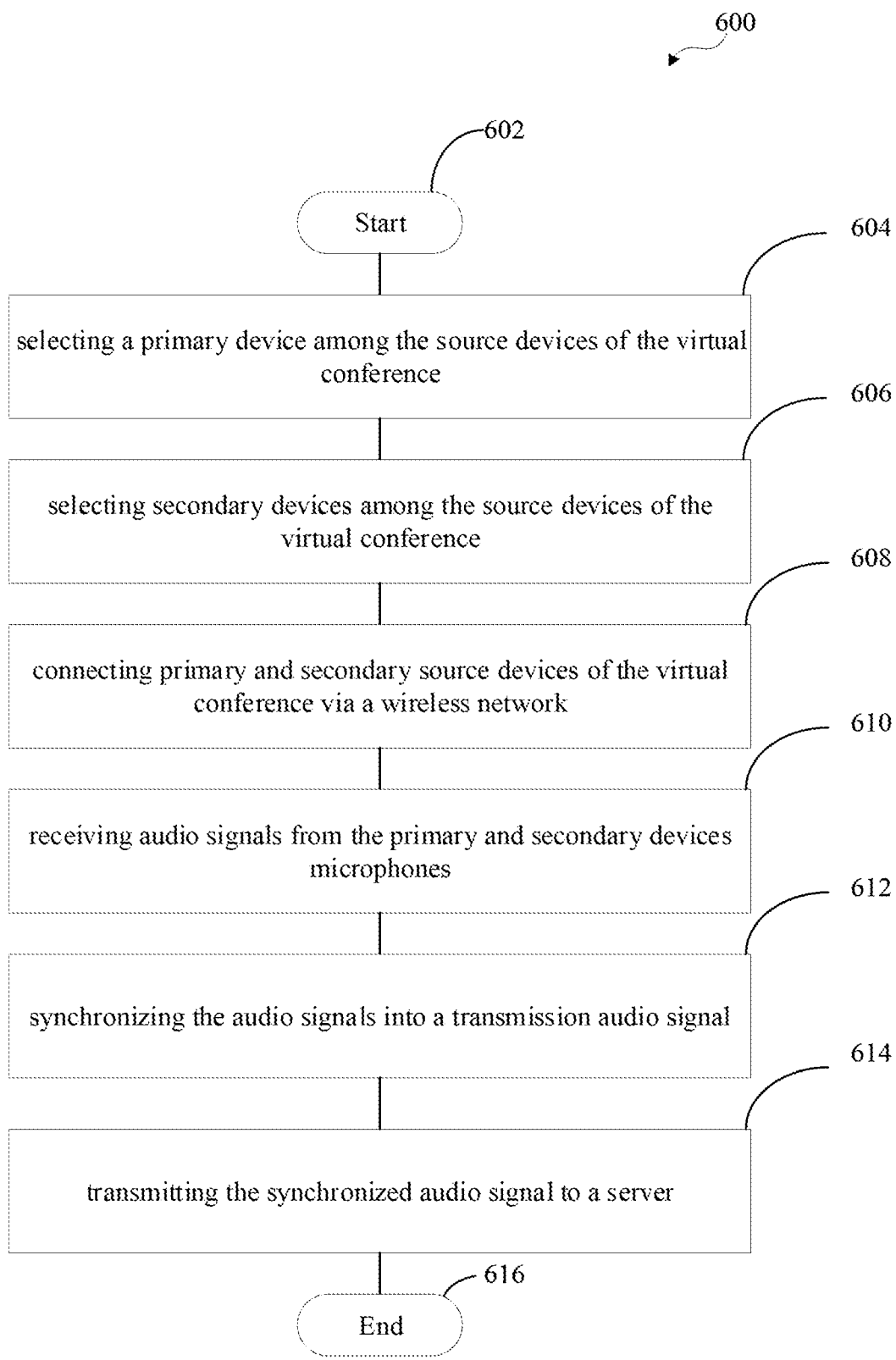
FIG. 6 illustrates a flowchart of a method of generating and transmitting a synchronized audio signal from a plurality of source devices to a server.

FIG. 6 illustrates a flow chart of a method 600 of generating and transmitting a synchronized audio signal from a plurality of source devices to a server. The server can subsequently transmit the synchronized audio signal to one or more destination devices in a virtual conference. The method starts at step 602. The method moves to step 604 by selecting a primary device among the source devices of the virtual conference. Next step 606 includes selecting secondary devices among the source devices of the virtual conference. Next step 608 includes connecting the primary and secondary source devices of the virtual conference via a wireless network. Next step 610 includes receiving audio signals from the primary and secondary devices microphones. Next step 612 includes synchronizing the audio signals into a transmission audio signal. Next step 614 includes transmitting the synchronized audio signal to a server. The method ends at step 616. It is understood that each step 604, 606, 608, 610, 612, 614 described in flowchart 600 and any feature of an example of a respective step 604, 606, 608, 610, 612, 614 may be combined with any aforementioned act and/or any example of the aforementioned act.

It should be understood that acts/steps of the exemplary flowcharts 200, 320, 420, 500, 600 can be performed in different orders than an order presented herein. Furthermore, some acts/steps of the exemplary flowcharts 200, 320, 420, 500, 600 may be performed in parallel rather than being performed sequentially. Also, the acts/steps of the exemplary flowcharts may be performed in a network environment in which some acts/steps are performed by different computers in the networked environment.

Figure 7:
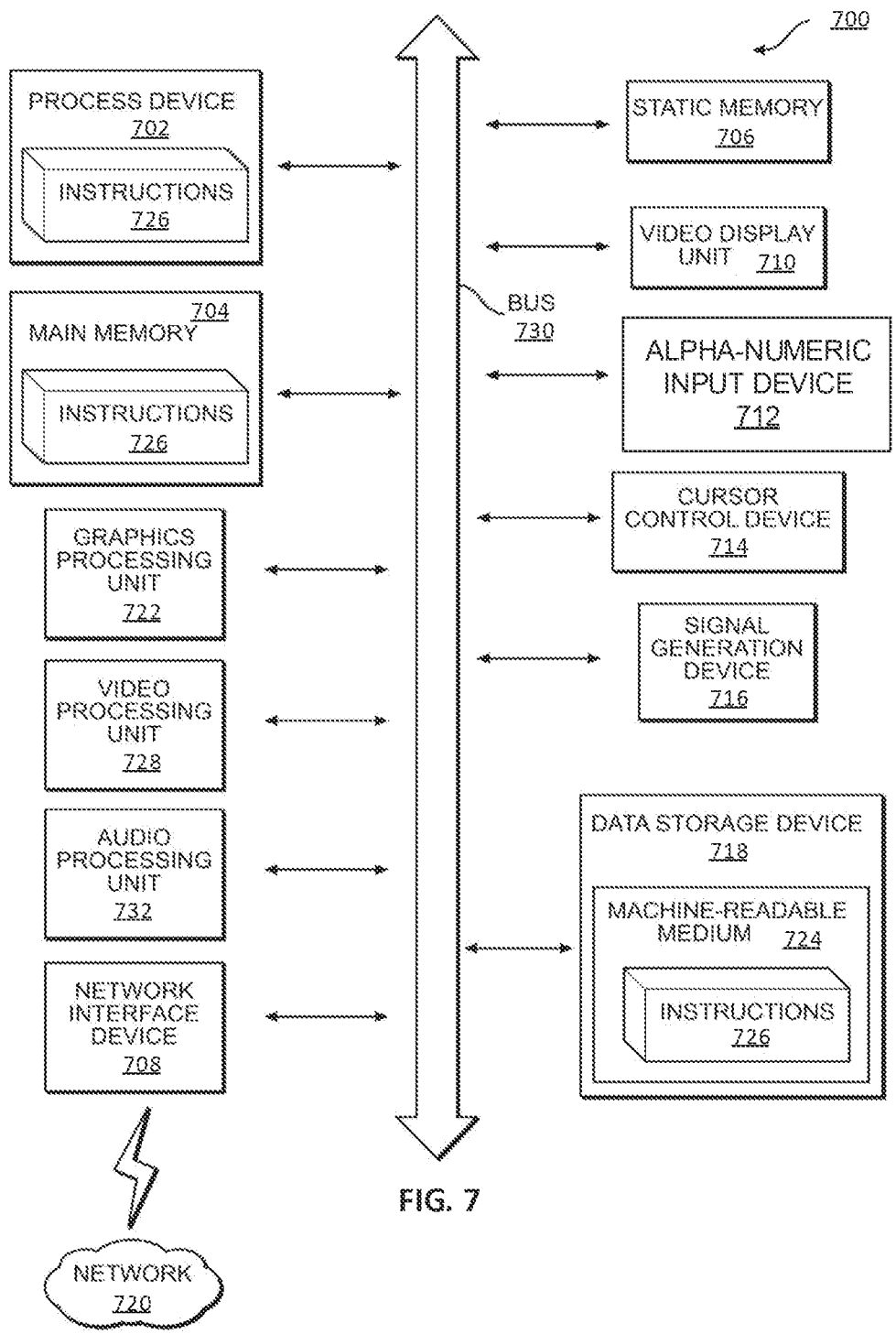
FIG. 7 is a diagram illustrating an exemplary computer that may perform processing in some embodiments.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:

extracting a plurality of signal frames from an audio stream of a primary device of a group of co-present devices;

applying a smoothing function to the plurality of extracted signal frames;

determining a first proximity index value for the primary device based at least in part on output of the smoothing function;

receiving respective additional proximity index values calculated by each of one or more secondary devices in the group of co-present devices;

comparing the first proximity index value and one or more of the respective additional proximity index values against a threshold value;

based on the comparison, selecting a particular proximity index value nearest to the threshold value; and identifying a particular source device from the primary device or the secondary devices as a source of the selected particular proximity index value; and designating the particular source device as an active speaker device.

2. The computer-implemented method of claim 1, further comprising:

upon extracting the plurality of signal frames, applying a windowing function to the plurality of extracted signal frames;

wherein applying the smoothing function comprises: applying the smoothing function to output of the windowing function.

3. The computer-implemented method of claim 2, wherein the audio stream is based on microphone data of the respective device.

4. The computer-implemented method of claim 2, further comprising:
at one or more of the secondary devices:
calculating a respective proximity index value;
generating an encoded audio stream of the secondary device; and
sending the encoded audio stream to the primary device.

5. The computer-implemented method of claim 4, wherein generating an encoded audio stream of the secondary device comprises:
appending the respective proximity index value to an audio stream of the secondary device.

6. The computer-implemented method of claim 4, further comprises:
wherein the primary device determines a dynamic delay based on one or more audio streams received from the respective secondary devices, each secondary device associated with a different dynamically-resizable buffer, wherein a size of a respective dynamically-resizable buffer is based, at least in part on: (i) an amount of time for a respective secondary device to encode at least a portion of its microphone data, and (ii) an amount of time for the primary device to decode at least the encoded portion of an audio stream.

7. A system comprising one or more processors, and a non-transitory computer-readable medium including one or more sequences of instructions that, when executed by the one or more processors, cause the system to perform operations comprising:
extracting a plurality of signal frames from an audio stream of a primary device of a group of co-present devices;
applying a smoothing function to the plurality of extracted signal frames;
determining a first proximity index value for the primary device based at least in part on output of the smoothing function;
receiving respective additional proximity index values calculated by each of one or more secondary devices in the group of co-present devices;
comparing the first proximity index value and one or more of the respective additional proximity index values against a threshold value;
based on the comparison, selecting a particular proximity index value nearest to the threshold value; and
identifying a particular source device from the primary device or the secondary devices as a source of the selected particular proximity index value; and
designating the particular source device as an active speaker device.

8. The system of claim 7, further comprising:
upon extracting the plurality of signal frames, applying a windowing function to the plurality of extracted signal frames;
wherein applying the smoothing function comprises:
applying the smoothing function to output of the windowing function.

9. The system of claim 8, wherein the audio stream is based on microphone data of the respective device.

10. The system of claim 8, further comprising:
at one or more of the secondary devices:
calculating a respective proximity index value;
generating an encoded audio stream of the secondary device; and
sending the encoded audio stream to the primary device.

11. The system of claim 10, wherein generating an encoded audio stream of the secondary device comprises:
appending the respective proximity index value to an audio stream of the secondary device.

12. The system of claim 10, further comprises:
wherein the primary device determines a dynamic delay based on one or more audio streams received from the respective secondary devices, each secondary device associated with a different dynamically-resizable buffer, wherein a size of a respective dynamically-resizable buffer is based, at least in part on: (i) an amount of time for a respective secondary device to encode at least a portion of its microphone data, and (ii) an amount of time for the primary device to decode at least the encoded portion of an audio stream.

13. A computer program product comprising a non-transitory computer-readable medium having a computer-readable program code embodied therein to be executed by one or more processors, the program code including instructions for:
extracting a plurality of signal frames from an audio stream of a primary device of a group of co-present devices;
applying a smoothing function to the plurality of extracted signal frames;
determining a first proximity index value for the primary device based at least in part on output of the smoothing function;
receiving respective additional proximity index values calculated by each of one or more secondary devices in the group of co-present devices;
comparing the first proximity index value and one or more of the respective additional proximity index values against a threshold value;
based on the comparison, selecting a particular proximity index value nearest to the threshold value; and
identifying a particular source device from the primary device or the secondary devices as a source of the selected particular proximity index value; and
designating the particular source device as an active speaker device.

14. The computer program product of claim 13, further comprising:
upon extracting the plurality of signal frames, applying a windowing function to the plurality of extracted signal frames;
wherein applying the smoothing function comprises:
applying the smoothing function to output of the windowing function.

15. The computer program product of claim 14, wherein the audio stream is based on microphone data of the respective device.

16. The computer program product of claim 14, further comprising:
at one or more of the secondary devices:
calculating a respective proximity index value;
generating an encoded audio stream of the secondary device; and
sending the encoded audio stream to the primary device.

17. The computer program product of claim 16, wherein generating an encoded audio stream of the secondary device comprises:
appending the respective proximity index value to an audio stream of the secondary device.

18. The computer program product of claim 16, further comprises:

wherein the primary device determines a dynamic delay based on one or more audio streams received from the respective secondary devices, each secondary device associated with a different dynamically-resizable buffer, wherein a size of a respective dynamically-resizable buffer is based, at least in part on: (i) an amount of time for a respective secondary device to encode at least a portion of its microphone data, and (ii) an amount of time for the primary device to decode at least the encoded portion of an audio stream.

* * * * *